(12) United States Patent
Qiao et al.

(10) Patent No.: US 11,481,928 B2
(45) Date of Patent: Oct. 25, 2022

(54) SYSTEM AND METHOD OF LIPSTICK BULKTONE AND APPLICATION EVALUATION

(71) Applicant: L'OREAL, Paris (FR)

(72) Inventors: Yue Qiao, Paris (FR); Kelsey Norwood, Clark, NJ (US); Anke Hadasch, Paris (FR); Gisela Perruna, Millington, NJ (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 17/161,930

(22) Filed: Jan. 29, 2021

(65) Prior Publication Data

US 2021/0241494 A1 Aug. 5, 2021

Related U.S. Application Data

(60) Provisional application No. 62/968,869, filed on Jan. 31, 2020.

(30) Foreign Application Priority Data

Apr. 6, 2020 (FR) ...................................... 20 03394

(51) Int. Cl.
*G06T 7/90* (2017.01)
*G06T 11/00* (2006.01)
*G06Q 30/06* (2012.01)
*A45D 44/00* (2006.01)

(52) U.S. Cl.
CPC ........... *G06T 7/90* (2017.01); *G06Q 30/0631* (2013.01); *G06T 11/001* (2013.01); *G06T 2207/10024* (2013.01); *G06T 2207/30201* (2013.01)

(58) Field of Classification Search
CPC combination set(s) only.
See application file for complete search history.

(56) References Cited

U.S. PATENT DOCUMENTS

| | | | |
|---|---|---|---|
| 5,860,809 A | 1/1999 | Meehan | |
| 2013/0117137 A1* | 5/2013 | Klein | G06Q 30/0207 705/16 |
| 2013/0300761 A1* | 11/2013 | Ahmed | G09G 5/02 345/595 |
| 2018/0075523 A1* | 3/2018 | Sartori Odizzio | G06F 16/435 |
| 2019/0059555 A1* | 2/2019 | Hogg | G01J 3/526 |
| 2020/0342630 A1* | 10/2020 | Elmoznino | G06T 11/00 |

FOREIGN PATENT DOCUMENTS

JP 5285249 B2 9/2013

OTHER PUBLICATIONS

International Search Report and Written Opinion dated Apr. 7, 2021 in PCT/US2021/015803, 14 pages.

* cited by examiner

*Primary Examiner* — Wesner Sajous
(74) *Attorney, Agent, or Firm* — Oblon, McClelland, Maier & Neustadt, L.L.P.

(57) ABSTRACT

A method for predicting applied lipstick color includes extracting reference hue information from one or more digital images of a plurality of lip-tone cards, each lip-tone card including a plurality of lip-tone swatches, a white swatch, and a black swatch; extracting applied hue information from one or more digital images of a plurality of lip-tone cards coated with lipstick; and generating a predicted applied lipstick color based on the extracted applied hue information and one or more inputs indicative of a lipstick selection.

7 Claims, 9 Drawing Sheets

LIP COLOR DATA REPRESENT A WIDE RANGE OF POPULATION GROUPS
31 lip clusters based on 1940 lip measurements
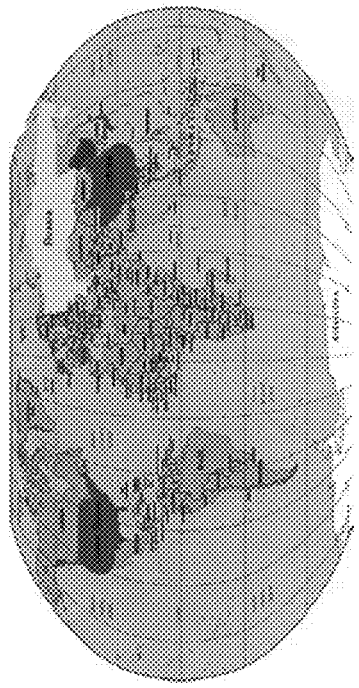
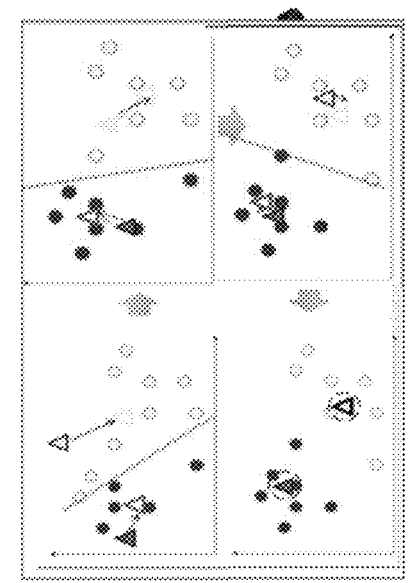
- Light colors
- Data are further clustered into 6 skin clusters
  - K-mean clustering
    - Define K centroids.
    - Minimize distance to centroid.
  - Co-variance method
    - Reduce number of clusters.
Fig. 5

A MATHEMATICAL MODEL (RADIAL BASIS FUNCTION) FOR PREDICTING TWO TYPES OF LIPSTICK APPLICATIONS
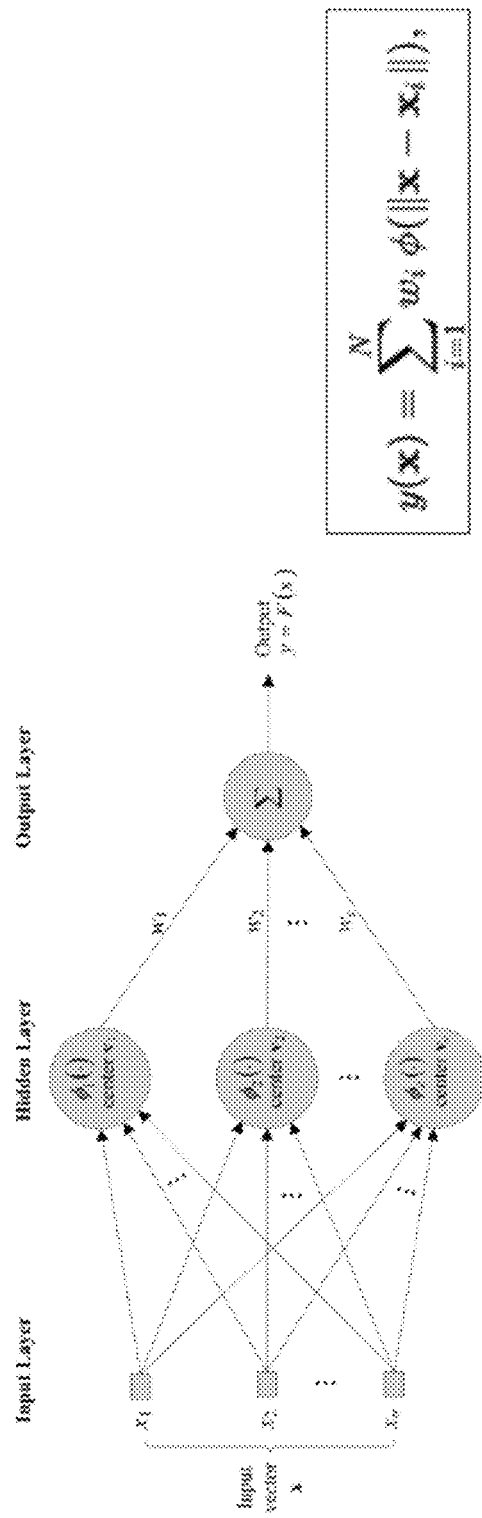
$$y(x) = \sum_{i=1}^{N} w_i \, \phi(\|x - x_i\|),$$
- 16 models bulk->application
  - 8 substrates
  - 2 architectures
- N models app.->app.
  - Lighter skin -> darker skin
Fig. 6

PROJECT RECAPS

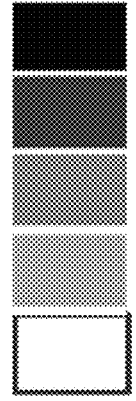
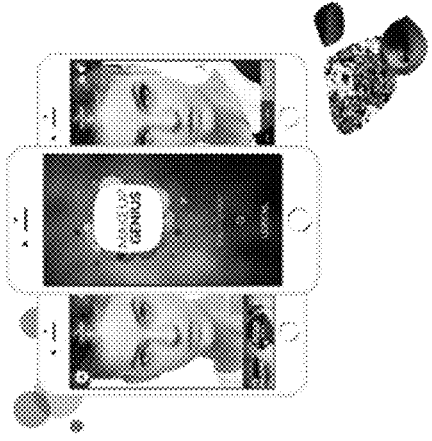

- Recap 1: Improving coverage by balancing inorganic and organic pigments composition and the level

- Recap 2: lip tone need to be added to the lipstick application protocol.

- Recap 3: Models were successfully created using radial basis function network to predict application on lip tone from bulk tone, and application on darker lip tone from lighter lip tone.

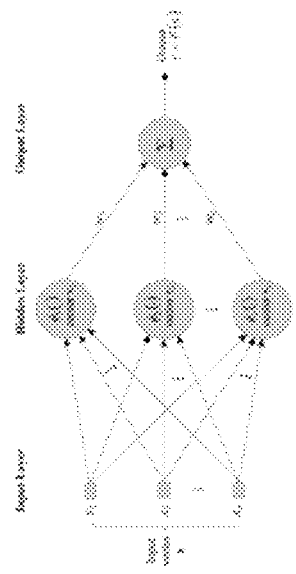

Fig. 9

SYSTEM AND METHOD OF LIPSTICK BULKTONE AND APPLICATION EVALUATION

CROSS REFERENCE TO RELATED APPLICATIONS

The present application is based on and claims priority to U.S. Provisional Application No. 62/968,869, filed Jan. 31, 2020, the disclosure of which is incorporated by reference herein in its entirety. The present application is also based on and claims priority to French Patent Application No. FR 20 03394, filed Apr. 6, 2020, the disclosure of which is incorporated by reference herein in its entirety.

BACKGROUND

A user's lip tone can be one from a spectrum of possible lip tones, making it a challenge to predict the resulting hue of an applied lipstick. Choosing the desired lipstick hue can be a difficult decision for a user, which is further compounded when the resulting hue of the lipstick is shifted after application to the user's lip. Thus, the user's lip tone and the type of lipstick are contributing factors to an accurate prediction. This can be additionally skewed based on other aspects of the user's regimen, including applying other treatments to the lips before and after the lipstick is applied, for example with a lip balm, a lip gloss, or a lip liner. Furthermore, an applied pressure of the lipstick onto the user's lips can affect the resulting coverage and hue. Accordingly, better methods and systems for predicting resulting hue of applied lip cosmetics are desired.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The present disclosure relates to a method of predicting applied lipstick color, including: extracting reference hue information from one or more digital images of a plurality of lip-tone cards, each lip-tone card including a plurality of lip-tone swatches, a white swatch, and a black swatch; extracting applied hue information from one or more digital images of a plurality of lip-tone cards coated with lipstick; and generating a predicted applied lipstick color based on the extracted applied hue information and one or more inputs indicative of a lipstick selection.

The foregoing paragraphs have been provided by way of general introduction, and are not intended to limit the scope of the following claims. The described aspects, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3-9 show an overview of the features of an embodiment for determining the liptone of a user.

DETAILED DESCRIPTION

Figure 1:
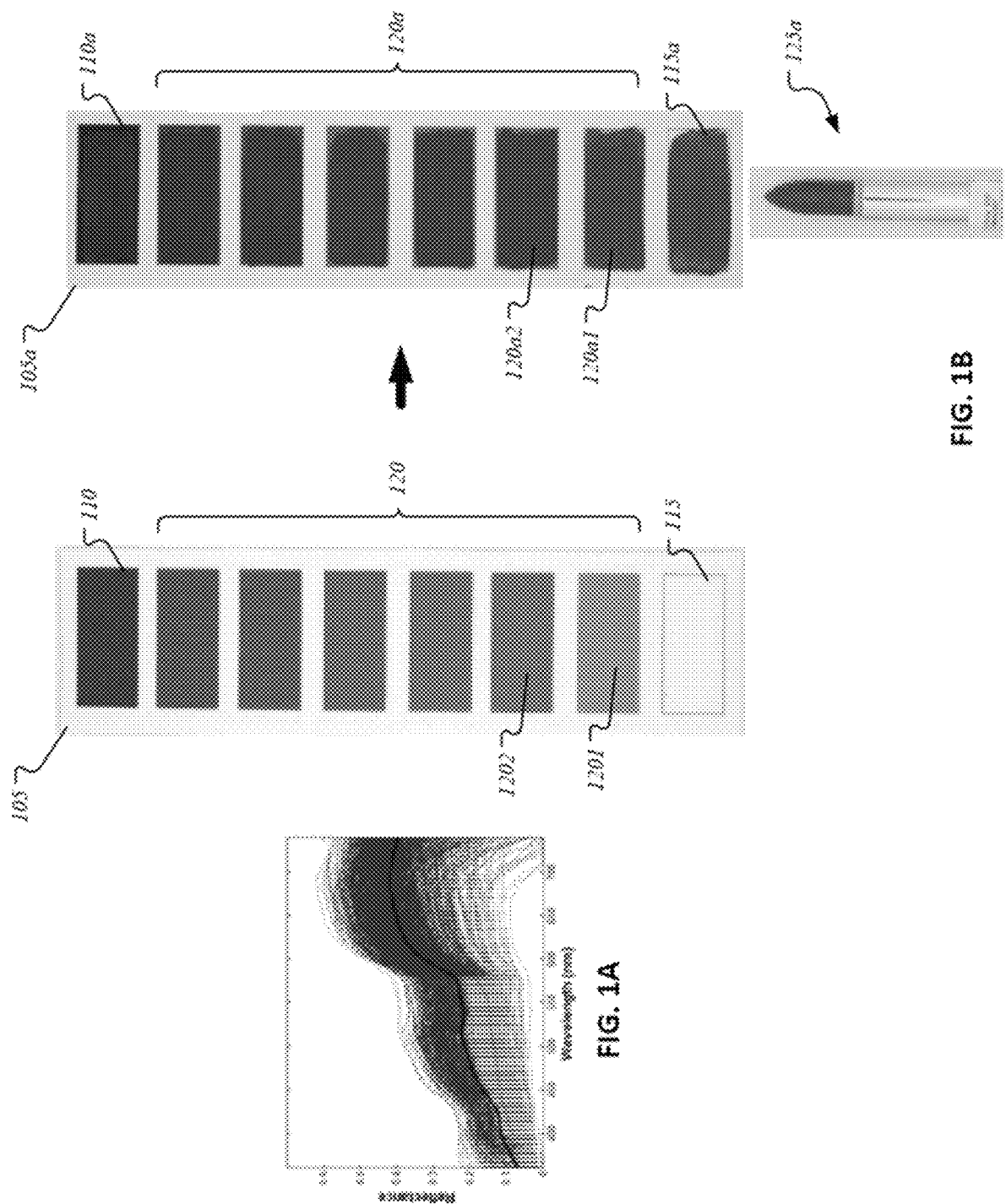
FIG. 1A shows a graph of a reflectance measurement, according to an exemplary embodiment of the present disclosure.
FIG. 1B shows a liptone card and a first application card, according to an exemplary embodiment of the present disclosure.

FIG. 1A shows a graph of a reflectance measurement, according to an exemplary embodiment of the present disclosure. The graph relates a reflectance of a material on a y-axis as a function of a wavelength detected on an x-axis. Any peak(s) exhibited by a trace in the graph describe hues predominantly reflected by the material. For a spectrum detected in the visible range, for example between 350 nm and 800 nm, the peak correlates to the color of the material. For example, a peak at ~400 nm describes a blue material. For example, a peak at ~700 nm describes a red material. Notably, constructive interference can be seen in the reflectance measurement if peak intensity increases for an additional layer of material added (wherein the material transmits light), as well as for a secondary peak exhibited at a multiple of the peak wavelength. For example, a secondary peak for 400 nm blue light emerges at 800 nm. The reflectance of the material is described as specular or diffuse based on a smoothness of a surface of the material. Notably, these optical properties impact the appearance and design of lipsticks, and ultimately, their application by a user.

FIG. 1B shows a liptone card 105 and a first application card 105a, according to an exemplary embodiment of the present disclosure. In an embodiment, the liptone card 105 includes a black swatch 110, a white swatch 115, and at least one liptone swatch 120. The at least one liptone swatch 120 is an area on the liptone card 105 that represents a liptone of the user. These can vary and be selected based on liptones measured from the users or predicted via emulation software and reproduced on the liptone card 105. For example, the at least one liptone swatch 120 is printed on the liptone card 105. Similarly, the black swatch 110 and the white swatch 115 are areas on the liptone card 105 that represent a black and a white hue, respectively. The black swatch 110 and white swatch 115 provide a reference point for which the at least one liptone swatch 120 is compared. The black swatch 110 has an RGB value that represents the hue black, for example (0, 0, 0), and the white swatch 115 has an RGB value that represents the hue white, for example (255, 255, 255). An uncoated reflectance spectrum is determined for each of the at least one lipstone swatch 120. For example, an optical spectrometer configured to scan through the visible light range can be used. Additionally, an optical image is obtained for each of the at least one liptone swatch 120. For example, a camera including an optical sensor is used to capture the images.

In an embodiment, a first lipstick 125 is applied to the black swatch 110, the white swatch 115, and each of the at least one liptone swatch 120 to produce the first application card 105a including a first coated black swatch 110a, a first coated white swatch 115a, and a first at least one coated liptone swatch 120a. For example, a hue of the first lipstick 125 is substantially fuchsia. As shown in FIG. 1B, the liptone card 105 includes six at least one liptone swatches 120 that progress from lighter near the white swatch 115 to darker near the black swatch 110. Concomitantly, the six first at least one coated liptone swatches 120a coated with the first lipstick 125a progress similarly from lighter near the first coated white swatch 115a to darker near the first coated black swatch 110a. Since the first coated white swatch 115a and the first coated black swatch 110a are also coated by the first lipstick 125a, the first coated white swatch 115a can exhibit a lightest tint for the first lipstick 125a and the first coated black swatch 110a can exhibit a darkest shade for the first lipstick 125a. The first at least one coated liptone swatches 120a can exhibit varying shifts in hue due to the contribution of the underlying liptone hue.

In an embodiment, a coated reflectance is determined for the first coated black swatch 110a, the first coated white swatch 115a, and each of the first at least one coated liptone swatch 120a. For example, the optical spectrometer is used. Images are also obtained, for example using the optical camera. The shift in the reflectance spectra from the uncoated to the coated reflectance is determined for each of the swatches. The change in the reflectance spectra from the white swatch 115 to the first coated white swatch 115a describes a shift in hue without any additional contributions from the user's liptone, while also describing a maximum lightness and a maximum chroma. Similarly, the change in the reflectance spectra from the black swatch 110 to the first coated black swatch 110a describes a shift in hue without any additional contributions from the user's liptone, while also describing a minimum lightness and a minimum chroma. Notably, the changes in the reflectance spectra from each of the at least one liptone swatches 120 to each of the corresponding first at least one coated liptone swatches 120a can be compared to both the change in the reflectance spectra from the white swatch 115 to the first coated white swatch 115a and from the black swatch 110 to the first coated black swatch 110a to determine the shift in hue due to contributions from the user's liptone. By the same measure, changes in lightness and chroma are also determined for each of the corresponding first at least one coated liptone swatches 120a. Here, chroma describes a chromatic strength of an object's hue, or the perceived amount of difference from a grey of the same lightness, while lightness describes a perceived brightness of the object's hue as compared to a perfectly white object.

In an embodiment, a library of images of the first application card 105a including a wide range of the first at least one coated liptone swatch 120a is generated for the first lipstick 125a and stored in a memory storage. The hue, chroma, and lightness are also determined for each of the first at least one coated liptone swatch 120a in the library and respective spectra for each are stored in the memory storage.

Figure 2:
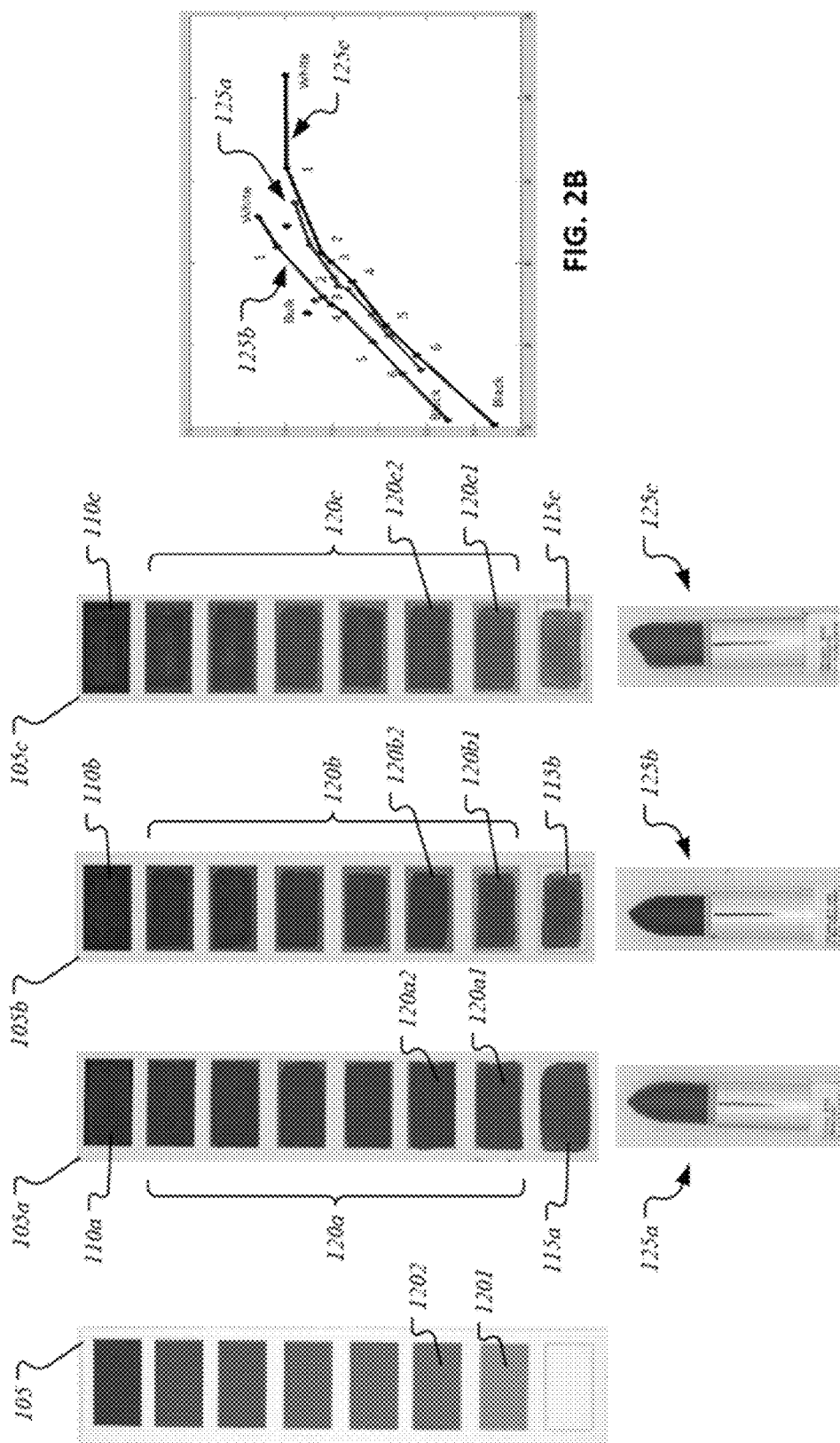
FIG. 2A shows additional lipstick applied to additional liptone cards, according to an embodiment of the present disclosure.
FIG. 2B shows a graph relating chroma and lightness, according to an embodiment of the present disclosure.
Figure 3:
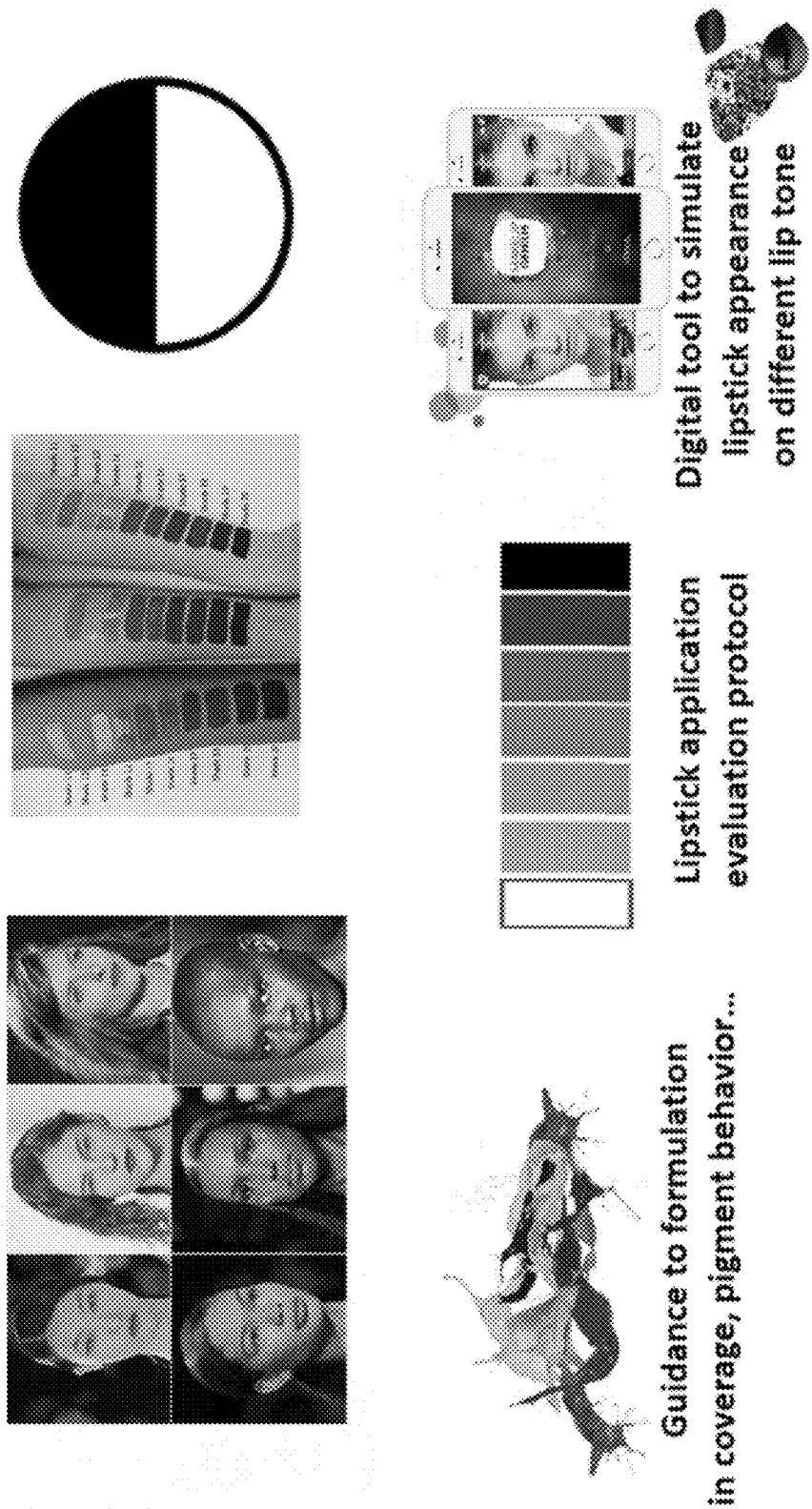
Figure 4:
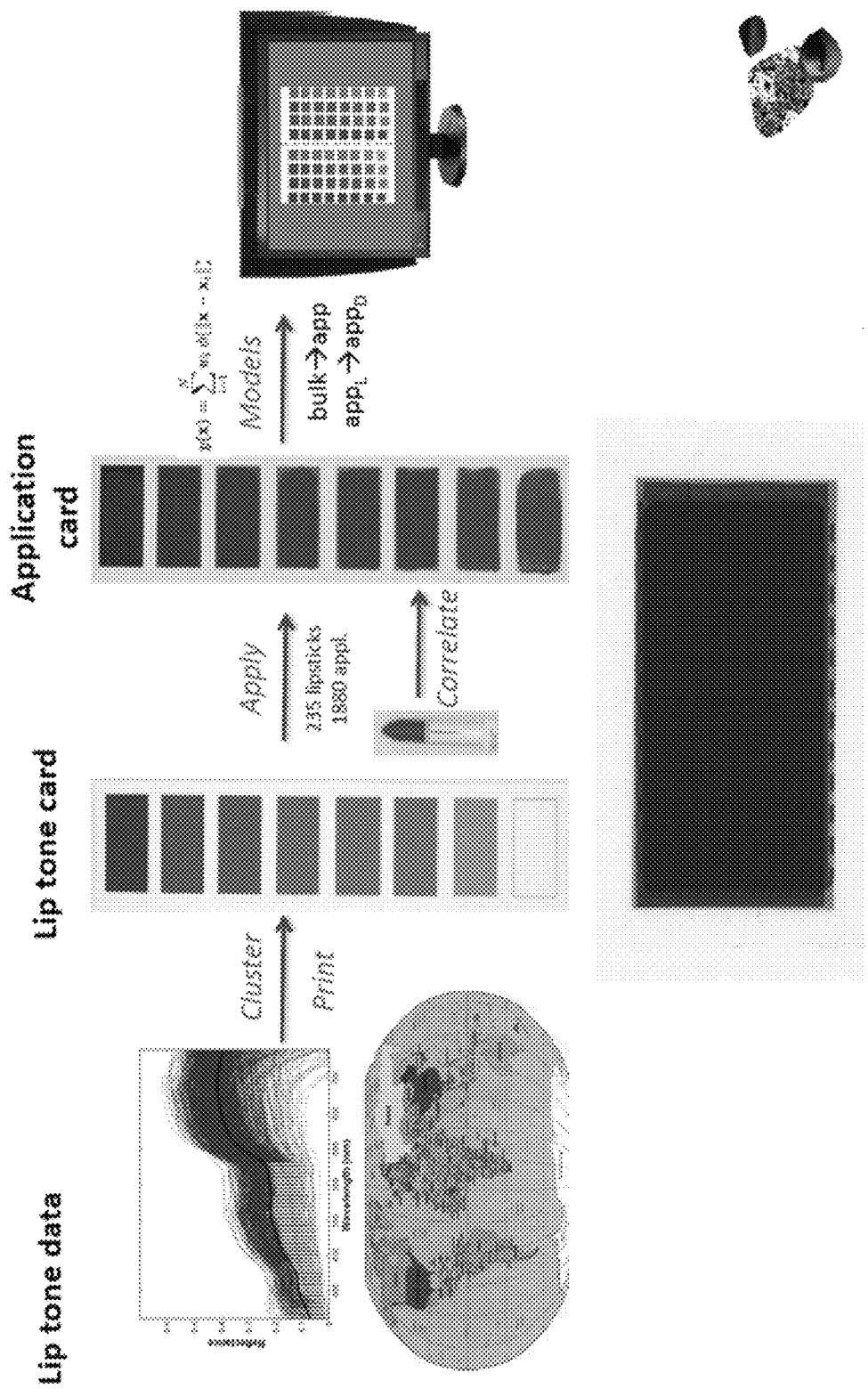
Figure 7:
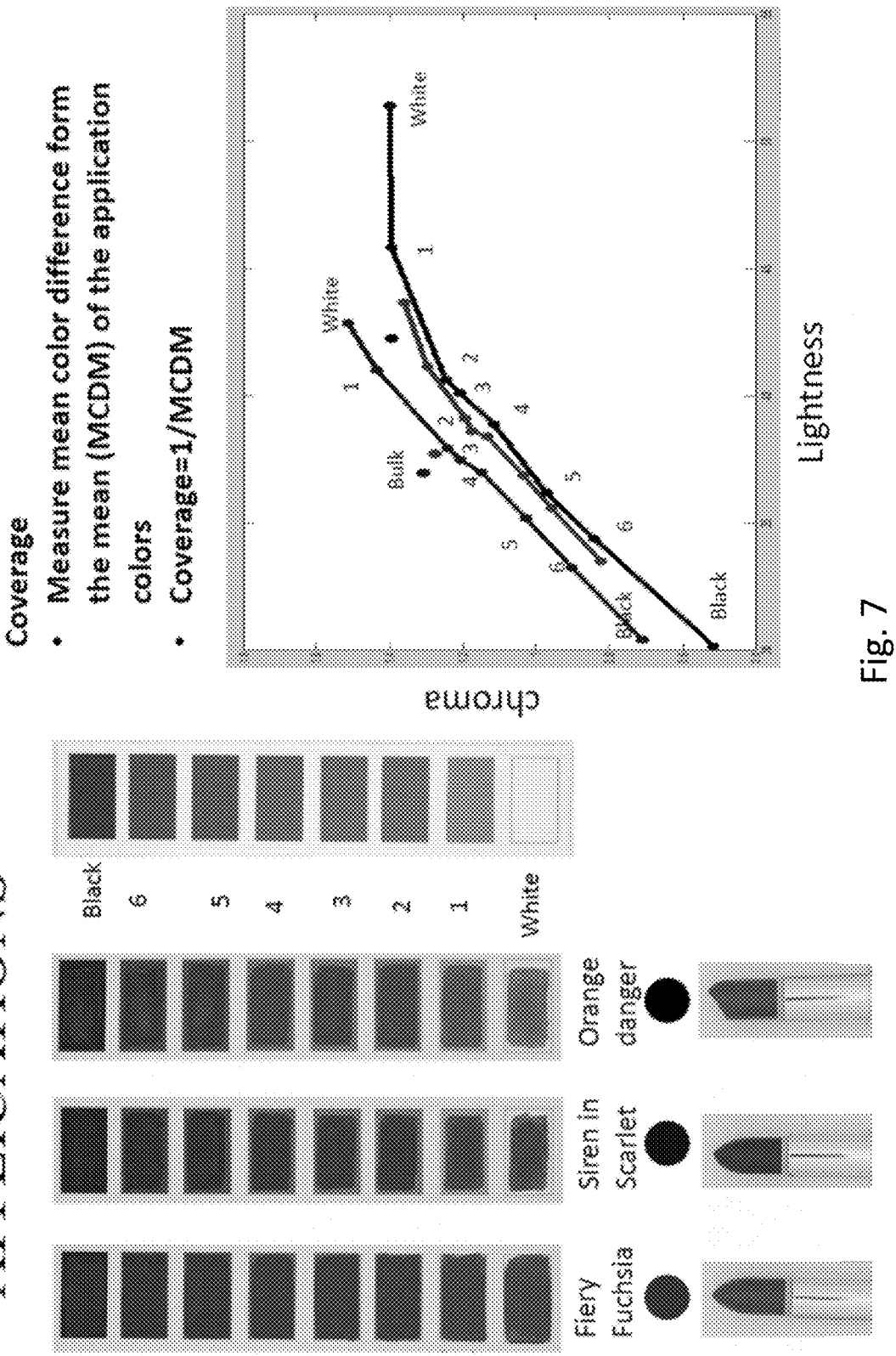
Figure 8:
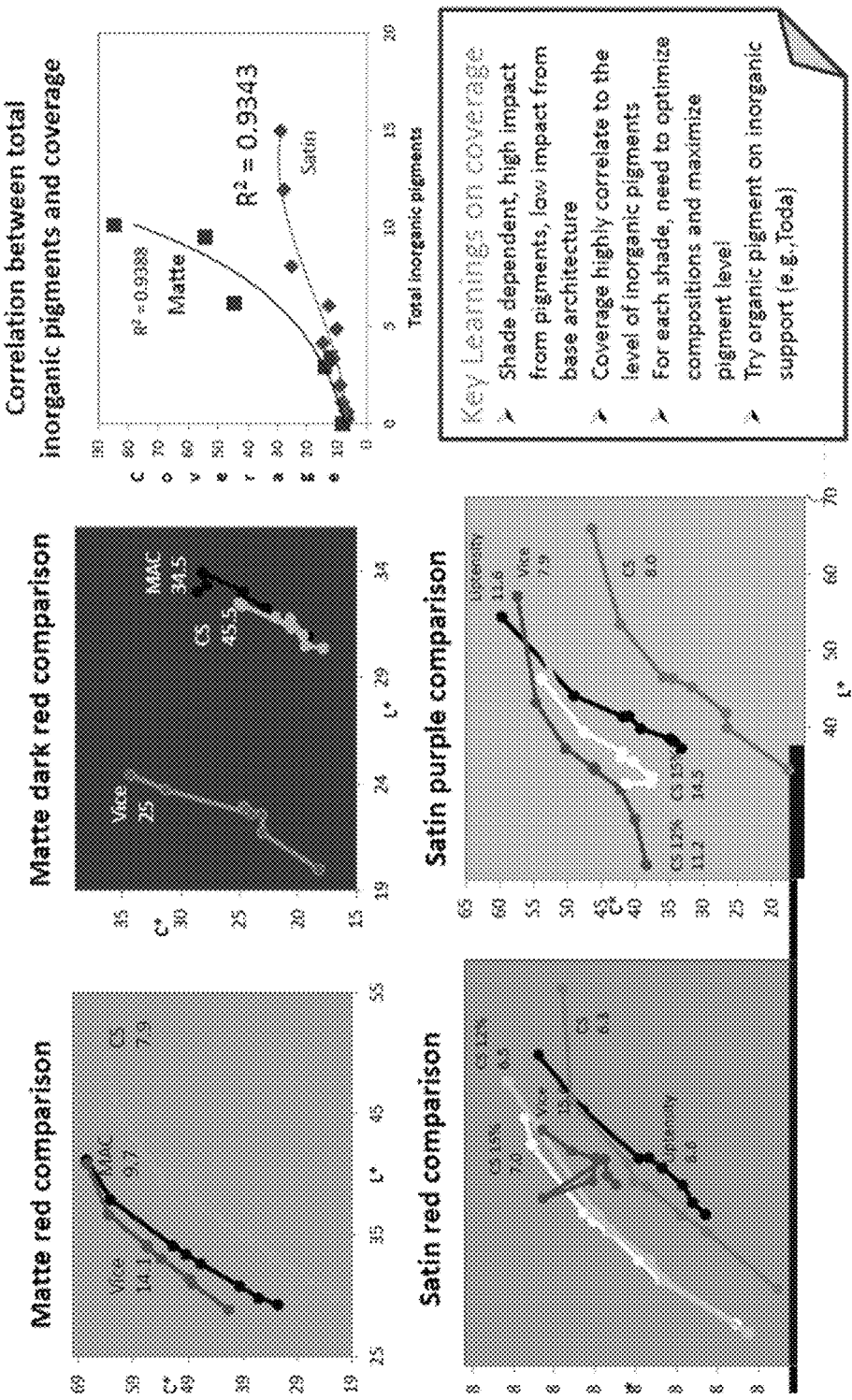

FIG. 2A shows additional lipstick applied to additional liptone cards 105, according to an embodiment of the present disclosure. In an embodiment, a second lipstick 125b and a third lipstick 125c are applied to the liptone card 105 to yield a respective second application card 105b and third application card 105c. A hue of the second lipstick 125b is, for example, substantially scarlet, and a hue of the third lipstick 125c is, for example, substantially orange. The second lipstick 125b is applied to the black swatch 110, the white swatch 115, and each of the at least one liptone swatch 120 to produce the second application card 105b including a second coated black swatch 110b, a second coated white swatch 115b, and a second at least one coated liptone swatch 120b. The third lipstick 125b is applied to the black swatch 110, the white swatch 115, and each of the at least one liptone swatch 120 to produce the third application card 105c including a third coated black swatch 110c, a third coated white swatch 115c, and a third at least one coated liptone swatch 120c. Similarly, the second application card 105b including a wide range of the second at least one coated liptone swatch 120b is generated for the second lipstick 125b and the third application card 105c including a wide range of the third at least one coated liptone swatch 120c is generated for the third lipstick 125c, and all are added to the library. The corresponding reflectance spectra, chroma, and lightness are also determined and stored in the memory storage.

FIG. 2B shows a graph relating chroma and lightness, according to an embodiment of the present disclosure. In an embodiment, a trace is generated describing the chroma (y-axis) as a function of the lightness (x-axis) for each of the swatches for the first lipstick 125a, second lipstick 125b, and third lipstick 125c. While only six liptones are plotted in the graph of FIG. 2B for each lipstick, it may be appreciated that as more of the at least one liptone swatch 120 are coated and measured for each lipstick, the data in each of the traces becomes more granular.

Advantageously, the library can be utilized to predict the hue of a lipstick applied on the user's lips. In an embodiment, the lipstick is the first lipstick 125a and the user's liptone matches one of the at least one liptone swatches 120. For example, the hue of the user's liptone is within a predetermined deviation threshold of the hue of one of the at least one liptone swatches 120. Thus, the corresponding reflectance measurement of the first coated at least one liptone swatch 120a for the first lipstick 125a describes the hue of the applied first lipstick 125a on the at least one liptone swatch 120 that most closely matches the user's liptone.

In an embodiment, the user's liptone does not match one of the at least one liptone swatches 120 in the library. That is, the hue of the user's liptone is outside a predetermined deviation threshold of the hue of one of the at least one liptone swatches 120. Here, interpolation between two of the at least one liptone swatches 120 most closely matching the user's liptone is performed to yield an interpolated liptone swatch that more closely matches the user's liptone. An interpolation between the two corresponding reflectance measurements for the two of the at least one liptone swatches 120 (most closely matching the user's liptone) is also performed to yield an interpolated hue for the applied first lipstick 125a. It may be appreciated that other targeted data in the library can be interpolated, for example chroma and lightness. Due to the diversity in users, collecting data on myriad liptones to expand the library can improve the accuracy of predicting the hue, chroma, and lightness of a lipstick after application to the user's lips.

In an embodiment, the library can be sorted by a single liptone to match the liptone of the user. Thus, all of the lipsticks that have been applied to the at least one liptone swatch 120 that matches the user's liptone are sorted. Subsequently, the user selects a desired appearance (hue) for the applied lipstick from the library and a determination of the lipstick to apply can be performed.

In an embodiment, the library does not include the matching liptone of the user. That is, the hue of the user's liptone is outside a predetermined deviation threshold of the hue of one of the at least one liptone swatches 120. Again, interpolation between two of the at least one liptone swatches 120 most closely matching the user's liptone is performed to yield the interpolated liptone swatch. For example, the user's liptone most closely matches a first at least one liptone swatch 1201 and a second at least one liptone swatch 1201. Interpolation between the two corresponding reflectance measurements for all of the lipsticks applied to the first at least one liptone swatch 1201 and the second at least one liptone swatch 1201 is performed to predict the resulting hue of all the applied lipsticks on the interpolated liptone swatch. For example, interpolation of the reflectance measurements for a first of the first at least one coated liptone swatch 120a1 and a second of the first at least one coated liptone swatch 120a2 is performed to predict the hue of the first lipstick 125a coated on the interpolated liptone swatch. Similarly, interpolation of the reflectance measurements for a first of the second at least one coated liptone swatch 120b1 and a second of the second at least one coated liptone swatch 120b2 is performed to predict the hue of the second lipstick 125b coated on the interpolated liptone swatch. The same interpolation is performed on the third lipstick 125c and all other lipsticks in the library. All of the predicted coated hues of the lipsticks on the interpolated liptone swatch can be filtered to yield predicted coated hues within the predetermined deviation threshold of the user's desired appearance (hue) for the applied lipstick, and a recommendation is made for the lipsticks corresponding to the predicted coated hues within the predetermined deviation threshold. While a lipstick yielding the exact user's desired appearance may not exist, the user can be recommended a plurality of options that closely match the desired appearance (hue). For example, the user may select one of the recommended lipsticks and a second recommendation can be made for a product to lighten the tint or darken the shade of the recommended lipstick. For example, a recommendation is made for two or more lipsticks to mix coatings in order to achieve the desired appearance (hue).

In an embodiment, the user selects a desired appearance (hue) for the applied lipstick from the library but it does not match any entry in the library. In this embodiment, the user's liptone matches one of the at least one liptone swatches 120. An interpolation is performed between all the lipsticks coated on the matching at least one liptone swatches 120 in order to determine at least two lipsticks that match the desired appearance (hue) when coated on the matching user's liptone. Here, a first recommendation is made for a lipstick that yields a slightly darker shade and a second recommendation is made for a lipstick that yields a slightly lighter tint when coated on the at least one liptone swatch 120 that matches the user's liptone.

In an embodiment, the liptone card 105 includes additional swatches that vary the hue, chroma, and lightness of the coated lipsticks. For example, the liptone card 105 includes additional at least one liptone swatches 120 having lip balm applied thereon before coating with the lipsticks. For example, the liptone card 105 includes additional at least one liptone swatches 120 for coating with the lipsticks followed by an additional coating of a second material, such as lip gloss, lip cream, a moisturizer, or any other top coat. For example, the liptone card 105 includes additional at least one liptone swatches 120 for coating with different types of lipsticks, for example a matte lipstick, a satin lipstick, a lip tint, a metallic lipstick, etc. For example, the liptone card 105 includes additional at least one liptone swatches 120 for coating with a lipstick at varied application pressures, such as light, normal, and firm pressures. Thus, for any one at least one liptone swatch 120, myriad appearances for myriad lipsticks of the same hue can be catalogued and used to improve a user's lipstick selection accuracy and experience.

In an embodiment, the liptone card 105 includes artificial lips, for example instead of the at least one liptone swatch 120 being printed on the liptone card 105. Each of the artificial lips is pigmented according to diverse user liptones, and advantageously, are textured to resemble the texture of real human lips, which affect the resulting appearance of applied lipsticks. For example, the artificial lips are molded collagen grown from skin keratinocytes grown on a scaffold, such as an acellular, nonimmunogenic dermal equivalent.

Subsequently, the aforementioned myriad coatings are coated onto the artificial lips. For example, lip balm is applied first, followed by the satin lipstick, followed by the lip gloss. A reflectance measurement and optical image can be obtained for each of the steps as each coating is applied and stored in the memory as part of the library. Notably, the reflectance measured from the artificial lips provides a more diffuse reflectance and realistic application environment as compared to a flat swatch.

FIGS. 3-8 illustrate additional details of features for (1) providing the guidance to lipstick formulation on coverage (2) evaluating the current lipstick application protocol and (3) creating models to predict lipstick application on different lip tones from the lipstick bulk tone.

The description set forth above in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

Embodiments of the present disclosure may also be as set forth in the following parentheticals.

(1) A method of predicting applied lipstick color, comprising: extracting reference hue information from one or more digital images of a plurality of lip-tone cards, each lip-tone card including a plurality of lip-tone swatches, a white swatch, and a black swatch; extracting applied hue information from one or more digital images of a plurality of lip-tone cards coated with lipstick; and generating a predicted applied lipstick color based on the extracted applied hue information and one or more inputs indicative of a lipstick selection.

(2) The method of (1), wherein generating the predicted applied lipstick color includes generating a predicted applied lipstick color based on the extracted applied hue information, the one or more inputs indicative of a lipstick selection, and user lip hue information.

(3) The method of either (1) or (2), further comprising: extracting user lip hue information from one or more digital images; and generating the predicted applied lipstick color based on the extracted applied hue information, the one or more inputs indicative of a lipstick selection, and the extracted user lip hue information.

(4) The method of (3), further comprising: generating one or more instances on a virtual display of a lipstick product predicted to result in a hue, on the user, that is within a predetermined threshold of the hue of the lipstick selection, based on the extracted applied hue information, the one or more inputs indicative of a lipstick selection, and the extracted user lip hue information.

(5) The method of (3), further comprising: generating one or more instances on a virtual display of a predicted resulting lipstick hue associated with the one or more inputs indicative of a lipstick selection, on the user, based on the extracted applied hue information, the one or more inputs indicative of a lipstick selection, and the extracted user lip hue information.

(6) The method of any one of (1) to (5), further comprising: determining a hue of the one or more inputs indicative of a lipstick selection.

(7) The method of any one of (1) to (6), further comprising: determining a lipstick having a hue that is within a predetermined threshold of the hue of the one or more inputs indicative of a lipstick selection.

(8) The method of (3), further comprising: determining a first liptone swatch of the plurality of lip-tone swatch having the hue that is within a predetermined threshold of the hue of the lips of the user.

(9) The method of (7), further comprising: determining, based the applied lipstick color corresponding to the lipstick, a recommended lipstick.

(10) The method of any one of (1) to (9), further comprising: transmitting one or more of predicted applied lipstick color information of a product based on the lipstick selection; and lipstick product recommendation information regarding a product predicted to result in a hue, on the user, that is within a predetermined threshold of product having a hue of the lipstick selection.

(11) A method of predicting applied lipstick color, comprising: receiving a desired lip appearance from a user, the desired lip appearance having a target hue; determining a hue of lips of the user; determining, based on application of a lipstick applied to a plurality of liptone swatches on a liptone card, a final hue of the applied lipstick color, the plurality of liptone swatches having a hue within a predetermined deviation range of the hue of the user's lips; determining the lipstick correlating to the final hue that most closely matches the target hue of the desired lip appearance; and transmitting, to the user, information of the lipstick.

(12) The method of (11), wherein the step of determining the plurality of liptone swatches having a hue within a predetermined deviation range of the hue of the user's lips further comprises: receiving the plurality of liptone cards, each including the plurality of liptone swatches, a white swatch, and a black swatch; determining a hue of each of the plurality of liptone swatches, the white swatch, and the black swatch; and determining a subset of the plurality of liptone swatches having the hue within a predetermined threshold of the hue of the user's lips.

(13) The method of (12), wherein the step of determining the lipstick correlating to the final hue that most closely matches the target hue of the desired lip appearance further comprises: coating the subset of the plurality of liptone swatches, the white swatch, and the black swatch with the lipstick; determining the final hue of each of the coated subset of the plurality of liptone swatches; and determining the lipstick coated on the subset of the plurality of liptone swatches having the final hue that most closely matches the target hue of the desired lip appearance.

(14) The method of (13), further comprising: upon determining the liptone card does not include a matching liptone swatch having a hue within the predetermined range of the hue of the user's lips, determining two matching liptone swatches in the plurality of liptone swatches having hues closest to the predetermined range of the hue of the user's lips; determining the final hues of a plurality of lipsticks applied to a first of the two matching liptone swatches and a second of the two matching liptone swatches; interpolating the final hues of the plurality of lipsticks applied to an interpolated liptone swatch having a hue between that of the first of the two matching liptone swatches and the second of the two matching liptone swatches; determining the lipstick correlating to the interpolated final hue that most closely matches the target hue of the desired lip appearance.

(15) The method of (14), further comprising obtaining a simulated image of the interpolated liptone swatch and a simulated image of the interpolated liptone swatch coated with the plurality of lipsticks.

(16) The method of (13), further comprising normalizing the determined final hues of each of the coated subset of the plurality of liptone swatches against the determined final hues of the black swatch coated with the lipstick and the white swatch coated with the lipstick.

(17) The method of (13), further comprising obtaining an image of the lips of the user and an image of the coated subset of the plurality of liptone swatches, wherein the hue of the user's lips is determined from the image of the user's lips and the final hue of each of the coated subset of the plurality of liptone swatches is determined from the image of the coated subset of the plurality of liptone swatches.

(18) The method of (17), further comprising storing, in a memory, the hues, the final hues, and the images of each of the uncoated and coated subset of the plurality of liptone swatches, the white swatch, and the black swatch.

(19) The method of (18), wherein determining the applied lipstick color is determined based on a trained neural network.

(20) The method of (19), wherein the neural network is trained using a training dataset, the input data of the training dataset including the hues, the final hues, and the images of each of the uncoated and coated subset of the plurality of liptone swatches, the white swatch, and the black swatch.

(21) A method of predicting applied lipstick color, comprising: receiving a lipstick selection from a user, the lipstick having a hue; determining a hue of lips of the user; determining, via a liptone card having the lipstick selection applied thereon, a final hue of the user's lips having the lipstick selection applied; and transmitting to the user the final hue of the user's lips.

(22) The method of (21), wherein the step of determining the final hue of the user's lips having the lipstick selection applied further comprises: receiving the plurality of liptone cards, each including the plurality of liptone swatches, a white swatch, and a black swatch; determining a hue of each of the plurality of liptone swatches, the white swatch, and the black swatch; and determining a matching liptone swatch having a matching hue within a predetermined threshold of the hue of the user's lips; and applying the lipstick selection to the matching liptone swatch.

(23) The method of (22), wherein upon determining the liptone card does not include a matching liptone swatch having a hue within the predetermined range of the hue of the user's lips, determining two matching liptone swatches in the plurality of liptone swatches having hues closest to the predetermined range of the hue of the user's lips; and interpolating the final hue of the lipstick selection applied to an interpolated liptone swatch having a hue between that of the first of the two matching liptone swatches and the second of the two matching liptone swatches.

(24) The method of (23), further comprising obtaining a simulated image of the interpolated liptone swatch and a simulated image of the interpolated liptone swatch coated with the lipstick selection.

(25) The method of any one of (22) to (24), further comprising normalizing the determined final hues of each of the coated plurality of liptone swatches against the determined final hues of the black swatch coated with the lipstick selection and the white swatch coated with the lipstick selection.

(26) The method of any one of (22) to (25), further comprising obtaining an image of the lips of the user and an image of the coated plurality of liptone swatches, wherein the hue of the user's lips is determined from the image of the user's lips and the final hue of each of the coated plurality of liptone swatches is determined from the image of the coated plurality of liptone swatches.

(27) The method of (26), further comprising storing, in a memory, the hues, the final hues, and the images of each of the uncoated and coated plurality of liptone swatches, the white swatch, and the black swatch.

(28) The method of (27), wherein determining the applied lipstick color is determined based on a trained neural network.

(29) The method of (28), wherein the neural network is trained using a training dataset, the input data of the training dataset including the hues, the final hues, and the images of each of the uncoated and coated plurality of liptone swatches, the white swatch, and the black swatch.

The invention claimed is:

1. A method of predicting applied lipstick color, comprising:
    receiving one or more digital images of a plurality of lip-tone cards, each lip-tone card including a plurality of lip-tone swatches, a white swatch, and a black swatch, each lip-tone swatch of the plurality of lip-tone swatches corresponding to a recorded natural lip tone of a reference user;
    extracting reference hue information from the one or more digital images of the plurality of lip-tone cards, the extracted reference hue information defining a hue of the each lip-tone swatch of the plurality of lip-tone swatches relative to the white swatch and the black swatch;
    receiving one or more digital images of a plurality of lip-tone cards coated with lipstick on the plurality of lip-tone swatches;
    extracting applied hue information from the one or more digital images of the plurality of lip-tone cards coated with lipstick, the extracted applied hue information defining a hue of the each lip-tone swatch of the plurality of lip-tone swatches coated with lipstick relative to the white swatch coated with lipstick and the black swatch coated with lipstick;
    receiving a digital image of a user lip-tone, the user lip-tone having a hue corresponding to the natural lip tone of a user;
    generating a predicted applied lipstick color based on the extracted applied hue information relative to the extracted reference hue information, the hue of the received user lip-tone, and one or more inputs indicative of a lipstick selection; and
    displaying, on a display, the predicted applied lipstick color information to the user corresponding to the one or more inputs indicative of the lipstick selection by the user.

2. The method of predicting applied lipstick color of claim 1, further comprising:
    generating a composite image of the lipstick product having a hue corresponding to the predicted applied lipstick color applied on lips of the user in a facial image of the user, the lipstick product being predicted to result in a hue, on the user, that is within a predetermined threshold of the hue of the lipstick selection, based on the extracted applied hue information, the one or more inputs indicative of a lipstick selection, and the extracted user lip hue information; and
    displaying the composite image on the display.

3. The method of predicting applied lipstick color of claim 1, further comprising:
    generating a composite image of a predicted resulting lipstick hue applied on lips of the user in a facial image of the user associated with the one or more inputs indicative of a lipstick selection, on the user, based on the extracted applied hue information, the one or more inputs indicative of a lipstick selection, and the extracted user lip hue information; and
    displaying the composite image on the display.

4. The method of predicting applied lipstick color of claim 1, further comprising:
   determining a hue of the one or more inputs indicative of a lipstick selection.

5. The method of predicting applied lipstick color of claim 1, further comprising:
   determining a first lip-tone swatch of the plurality of lip-tone swatches having the hue that is within a predetermined threshold of the hue of the lips of the user.

6. The method of predicting applied lipstick color of claim 1, further comprising:
   determining, based the predicted applied lipstick color corresponding to the lipstick, a recommended lipstick.

7. The method of predicting applied lipstick color of claim 1, further comprising:
   transmitting one or more of
      predicted applied lipstick color information of a product based on the lipstick selection; and
      the lipstick product recommendation information regarding a product predicted to result in a hue, on the user, that is within a predetermined threshold of product having a hue of the lipstick selection.

* * * * *